Figure 1:
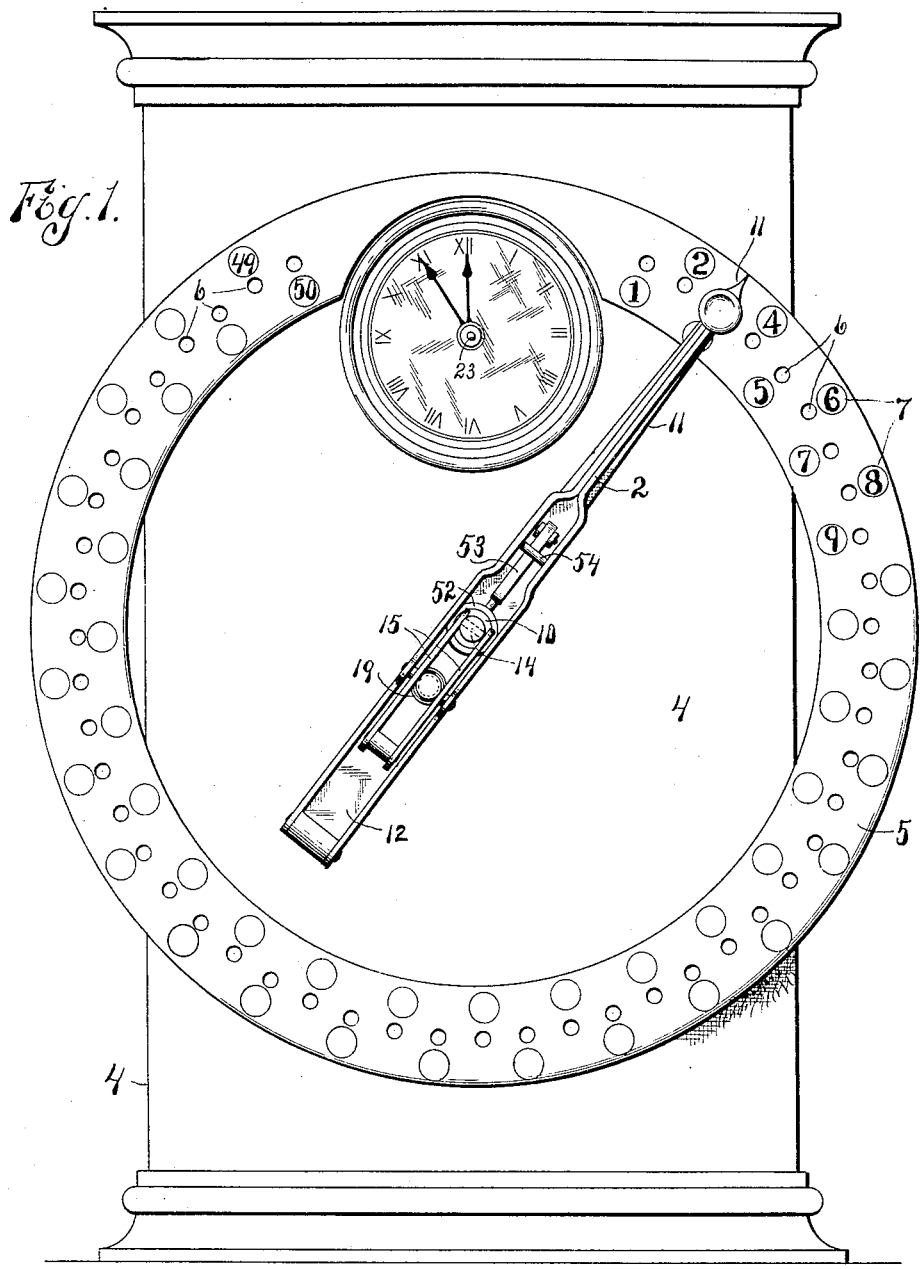

C. E. TOMLINSON.
TIME RECORDER.
APPLICATION FILED MAY 10, 1911.

1,174,776.

Patented Mar. 7, 1916.
5 SHEETS—SHEET 1.

WITNESSES:
Chas H. Young.
S. Davis.

INVENTOR
Charles E. Tomlinson
BY
Parsons Hall Bodley
ATTORNEYS.

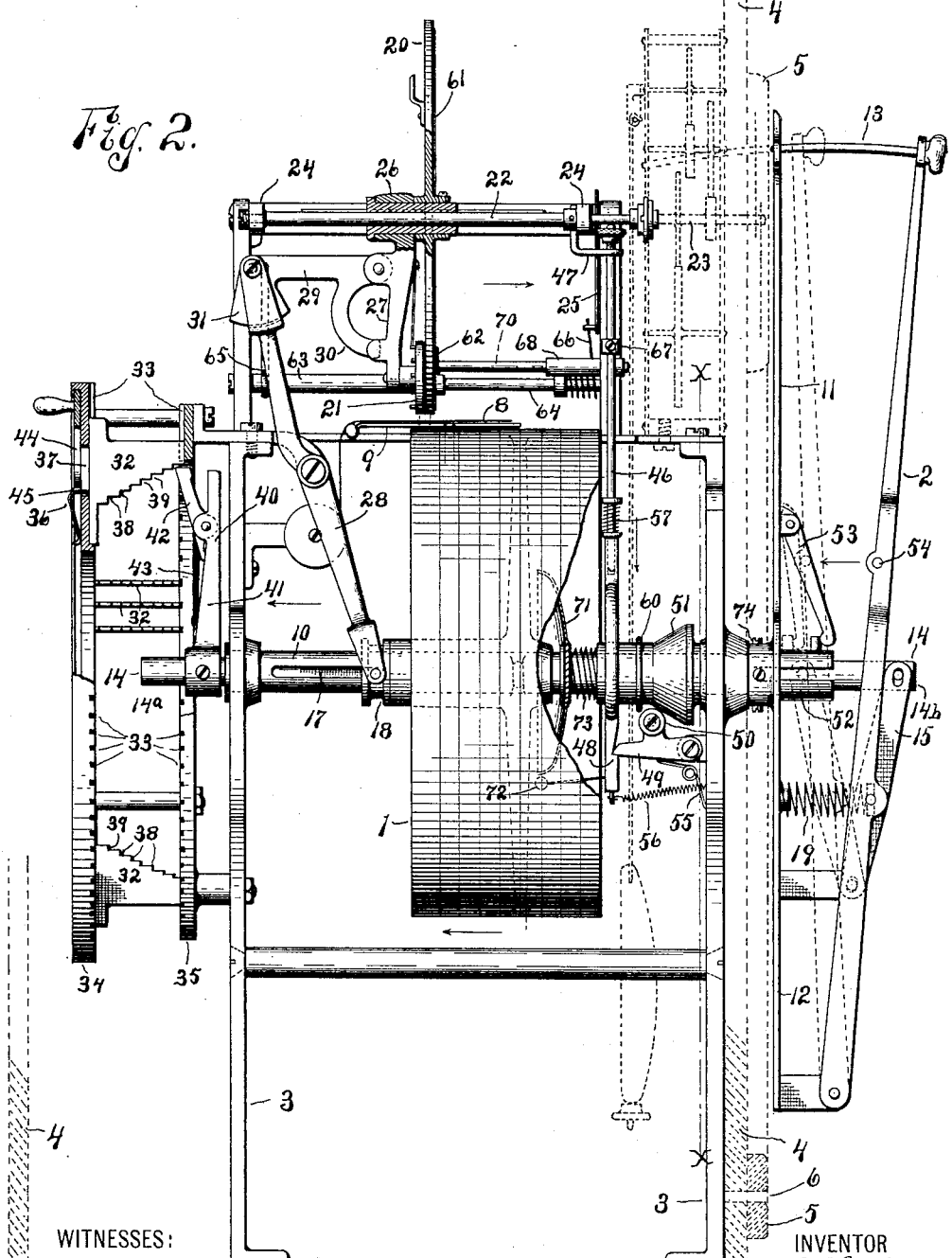

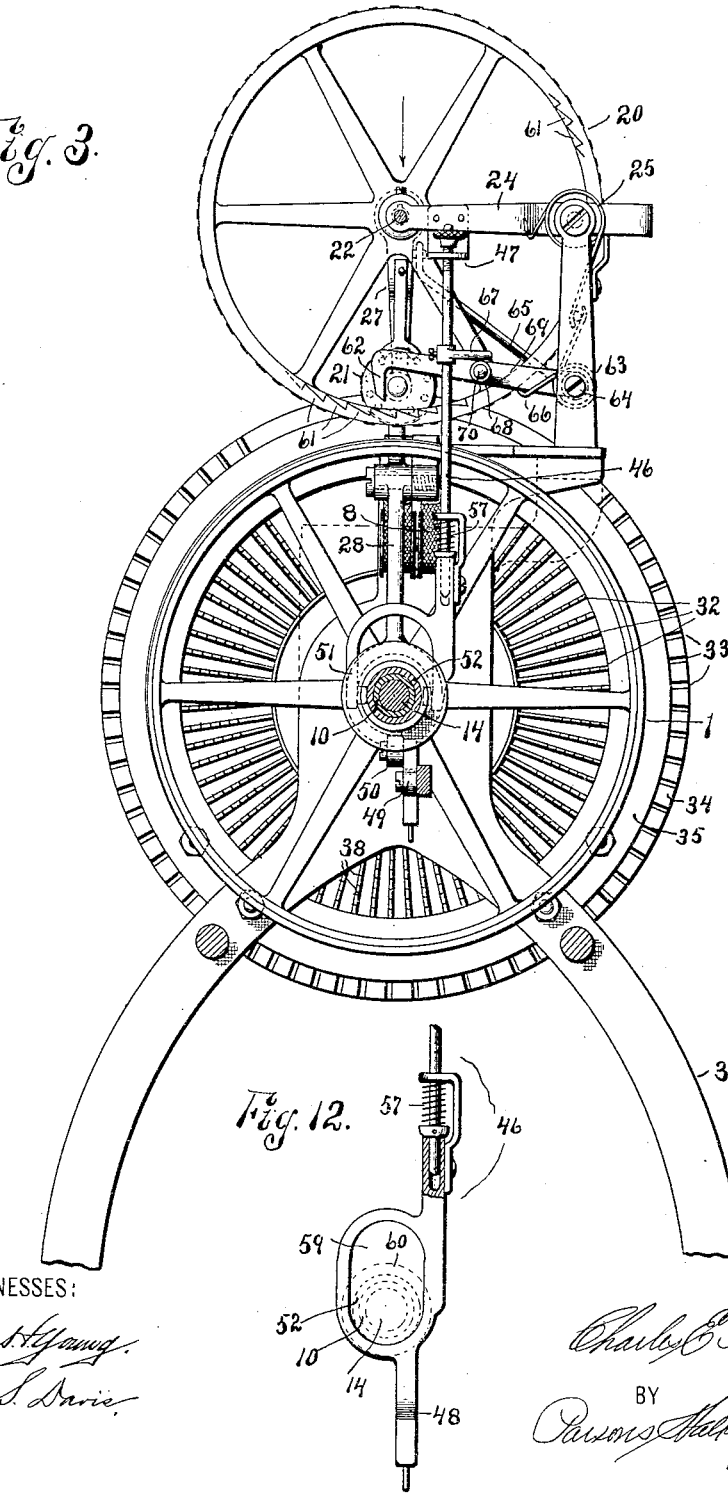

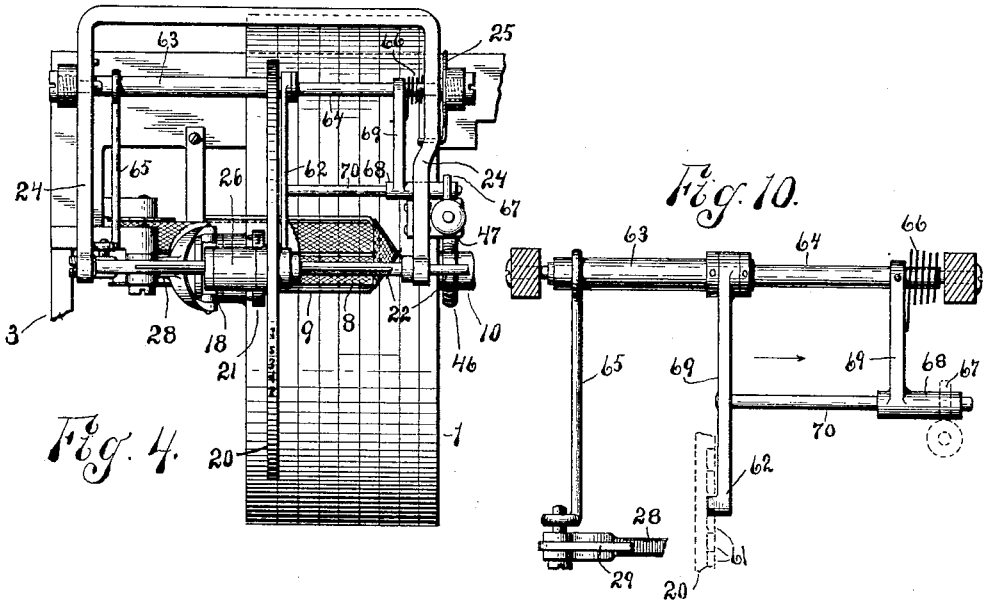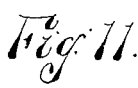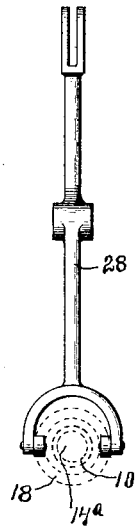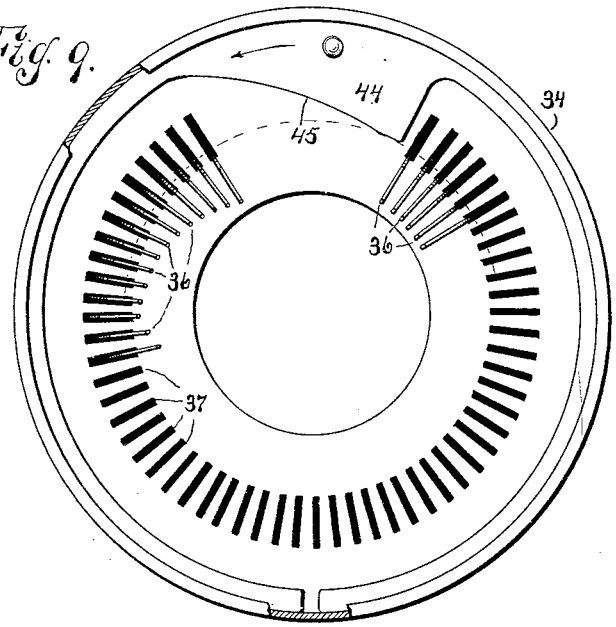

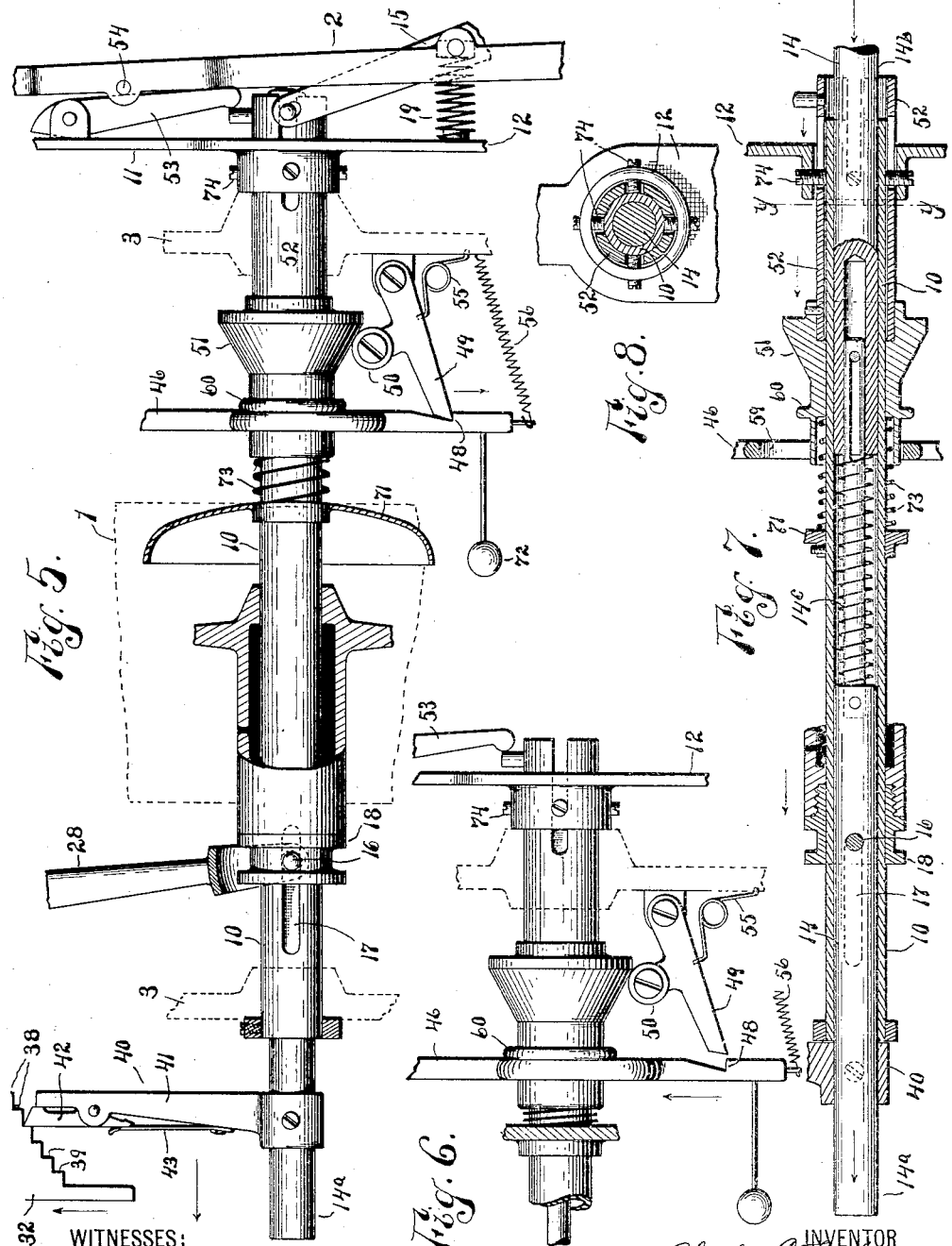

UNITED STATES PATENT OFFICE.

CHARLES E. TOMLINSON, OF SYRACUSE, NEW YORK, ASSIGNOR, BY MESNE ASSIGNMENTS, TO INTERNATIONAL TIME RECORDING COMPANY OF NEW YORK, OF ENDICOTT, NEW YORK, A CORPORATION OF NEW YORK.

TIME-RECORDER.

1,174,776.  Specification of Letters Patent.  Patented Mar. 7, 1916.

Application filed May 10, 1911. Serial No. 626,223.

*To all whom it may concern:*

Be it known that I, CHARLES E. TOMLINSON, of Syracuse, in the county of Onondaga and State of New York, have invented a certain new and useful Time-Recorder, of which the following is a specification.

My invention relates to recorders adapted for use by a plurality of men, and of that type wherein the records of each man are printed side by side in a space individual to him and the spacing between his successive records is accomplished independently of the records, or the spacing of the records, of the other men using the machine.

The object of the invention is to provide a machine which is particularly durable and simple in construction and efficient in use.

One exemplification of the invention is shown in the accompanying drawings wherein:

Figure 1 is a front elevation of a recorder embodying my invention; Fig. 2, is a side elevation of the same with certain parts shown in dotted lines and other parts shown in section; Fig. 3, is a transverse sectional view; Fig. 4, is a plan view of the impression making element and parts associated therewith; Fig. 5, is a side elevation with parts in section of a portion of the machine; Fig. 6, is a side elevation of certain of the parts shown in Fig. 5 with such parts in a position different from that occupied by them in the last-named figure; Fig. 7, is a longitudinal sectional view of a part of the mechanism shown in Fig. 5; Fig. 8, is a transverse sectional view on the line $y$—$y$, Fig. 7; Fig. 9, is rear elevation for illustrating the cam used for returning to initial positions the individual abutments forming a part of the stop mechanism; Fig. 10, is a detail plan view illustrating the mechanism coacting with one of the type wheels for holding it against movement during the printing operation; Fig. 11, is an elevation of the lever interposed between the record carrying drum and the type wheels; and Fig. 12, is a detail view of the link associated with the rocking frame carrying the type wheels.

In the embodiment of my invention herein illustrated the record receiving element is in the form of a strip of paper removably supported upon a drum 1 and the impression making element is in the form of two type wheels carrying minute and hour indicating characters respectively.

The record receiving element is preferably provided with a plurality of transversely disposed spaces each designed to be appropriated to one of a plurality of workmen registering on the machine.

The impression making element and the drum are designed to have relative movement in one direction for bringing a desired space on the record sheet to the printing point, to have movement in a second direction for making an impression, and to have movement in a third direction for spacing between successive impressions in the same space. These three movements are hereinafter respectively called locating, printing and spacing and all of the same, in the illustrated exemplification of my invention, are effected by operating a single handle designated 2.

In the spacing movement the elements have relative movement from an initial starting position, or position of rest, and are returned thereto prior to a succeeding spacing movement.

The mechanism of the machine is preferably mounted in a suitable frame 3 within a case 4 provided with a dial 5 in which are openings 6 having associated therewith indicating characters 7 adapted to be appropriated to the workmen registering on the machine.

A ribbon 8 is preferably associated with the impression element for making a mark upon the paper, or impression receiving element, and this ribbon may be supported in any desired manner as by a fixed guide 9.

The drum 1 is mounted on a sleeve 10 revolubly and non-slidably mounted in the frame 3 and carrying at its front end a pointer 11 and a plate 12 forming the tail of the latter, to which the handle 2 is pivoted at one end. The opposite end of the handle carries a locating pin 13 coacting with the openings 6 in the dial in a well known manner, and the intermediate part of the handle coöperates with a shaft 14 for moving the latter endwise. This movement is multiplied by a lever 15 pivotally connected at its ends to the shaft 14 and plate 12 respectively and at its intermediate portion to the handle 2.

The shaft 14 extends through the sleeve 10 and is revoluble therewith and is movable endwise therein independently of the same.

The drum 1 is connected to the intermediate part of the shaft 14 preferably by a pin 16 extending transversely through the latter and through slots 17 in the sleeve 10 and engaging a collar 18 forming a detachable end for the hub of the drum 1.

Suitable means are provided tending to maintain the drum 1 in its initial position, or position of rest, and for returning the same thereto after it has been shifted away therefrom by swinging the handle 2 inwardly on its pivot, and in the illustrated machine, for this purpose a helical spring 19 is provided which is interposed between the plate 12 and the connection between the handle 2 and the lever 15.

The impression making element preferably comprises type wheels 20, 21, the former being keyed to a shaft 22, connected by a suitable coupling to the minute shaft 23 of a suitable clock mechanism and said shaft 22 is arranged parallel with the shaft 14 and is journaled in a suitable frame 24 pivoted to arms on the main frame 3 and adapted to be rocked against the tension of a spring 25 in order to carry the type wheels into contact with the receiving element on the drum 1.

The wheel 20 is preferably formed with an axially arranged hub having mounted thereon a sleeve 26 from which extends a radial arm 27 carrying at its outer end the wheel 21 actuated or rotated one step upon each revolution of the wheel 20 by any well known means which it is not necessary to describe in detail herein.

For minimizing the movement required for spacing between successive records, the impression making element is preferably shiftable simultaneously with, but in the opposite direction to, the drum during the axial movement thereof. In the illustrated exemplification of my invention this movement is obtained by a lever 28 pivotally supported intermediate of its ends from the frame 3 and connected at its lower end to the drum 1 and at its upper end to the impression making element through a link 29 pivotally connected at one end in a bifurcation at the upper end of the lever 28 and at its opposite end to the arm 27 adjacent the sleeve 26.

It will be understood that for spacing between records, it is not necessary for the impression element to be movable; spacing may be obtained through the movement of only the drum 1, but in that case the drum is required to have a greater range or extent of movement for the same spacing than in the illustrated arrangement.

For preventing the wheel 21 from swinging about the axis of the shaft 22, the link 29 is provided at one end with a lateral extension 30 engaging between lugs on the arm 27 and at its opposite end with a segmental extension 31 having flat faces coöperating with the inner faces of the bifurcated end of the lever 28.

It will be understood that the spring 19 not only tends to hold the drum 1 in its position of rest, or initial position, but that through the described mechanism this spring tends to hold the impression making element in an initial position, or position of rest, at one end of the drum.

Suitable stop mechanism including, an abutment individual to each workman registering on the machine, or individual to each space on the record receiving element, and a coöperating abutment common to all the workmen, or all the spaces on the record receiving element, and designed to coact individually with the first-named abutments, is provided for determining the extent of movement of the drum and impression making element away from their initial positions, or positions of rest.

The individual abutments are designated 32 and are movable in radial grooves or guides 33 formed in the opposing faces of circular plates 34, 35 arranged concentric with the shaft 14 and fixedly supported from the rear of the frame 3. These abutments are held in the various positions assumed by them in the guides by suitable devices here shown as springs 36 extending through radial slots 37 in the rear plate 34 and frictionally engaging the outer face of the latter. Each abutment 32 is formed with a series, or set, of radially disposed surfaces or shoulders 38 and with a second series, or set, of shoulders or surfaces 39 perpendicularly disposed in reference to the shoulders 38. The abutment common to all of the workmen, or spaces of the impression receiving element, is designated 40 and is carried by the shaft 14 and includes means for shifting the abutments 32 individually, so as to successively bring the shoulders thereof into operative positions.

As herein illustrated the abutment 40 comprises an arm 41 having at one end a hub secured to the shaft 14 by a suitable set screw, and a dog 42 pivotally connected to the arm 41 adjacent the outer end thereof and having a free end held by a spring 43 in advance of the arm 41 and in position to engage the shoulders of the abutments 32.

When the drum 1 is rotated to bring a particular space on the impression receiving element to the printing point, which is accomplished by the operator moving the handle 2 and rotating the shaft 14, the abutment 40 is brought into registration with the abutment 32 associated with the space on the receiving element at the printing point and thereafter when the shaft 14 is moved axially, upon the handle 2 being pressed in, the face of the dog 42 is brought into contact with and arrested by the alined shoulder 39 of said abutment 32. In the continued endwise movement of the shaft 14 the dog 42 is shifted against the tension of the spring 43 and the free end thereof contacts with the adjacent surface 38 of said abutment 32 and shifts the latter radially until the dog 42 is arrested by the rear face thereof engaging the opposing face of the arm 41, whereupon, further movement is prevented. Thus, in effect the arm 41 and dog 42 constitute a toggle lever which is normally held in broken position by the spring 43 and is straightened out in the movement of the shaft 14 after the free end of the dog contacts with an arresting shoulder 39 of one of the abutments 32 and in such straightening movement the engaged abutment is fed outwardly one step so that on the next engagement of the dog with such abutment it will coöperate with the succeeding shoulder 39 thereon.

The abutments 32 may all be moved inwardly to their starting positions by any suitable means as a cam plate 44 rotatably mounted in the ring 34, and provided with a cam surface 45 for engaging the springs 36.

Any suitable means may be interposed between the handle 2 and the printing couple for operating the latter to make an impression during the final portion of the inward movement of the handle. The illustrated mechanism includes a link 46 having at its upper end a head engaging an arm 47 associated with the rocking frame 24 and having a shoulder 48 at its lower end engaged by the free end of an arm 49 pivoted to the frame 3 and carrying a roller 50 coöperating with a cam 51 formed on the inner end of a barrel 52 slidably mounted on the sleeve 10 and movable endwise thereof by an arm 53 engaged by a surface 54 of the handle 2. A spring 55 tends to hold the arm 49 in elevated position and a spring 56 tends to draw the free end of the link 46 into position for engaging the shoulder 48 with the arm 49. The link 46 is preferably provided with a yielding part 57 for cushioning the action of the type wheels and with an opening 59 encircling the barrel 52 and having a wall designed to be engaged by an annular shoulder 60 on the barrel 52, in the final inward movement of the latter, for disengaging the free end of the link from the arm 49 so that the rocking frame 24 may return to its starting position under the influence of the spring 25.

For locking the wheel 20 against rotation during the printing action it is preferably provided with ratchet teeth 61 designed to be engaged by a detent 62 carried by a sleeve 63 slidably mounted on a shaft 64 held in the arms of the frame 3 supporting the frame 24. A link 65 couples the upper end of the lever 28 to the sleeve 63, as shown in Fig. 10, for moving the detent 62 with the type wheels in the axial shifting thereof. The detent 62 is normally held in disengaged position by a spring 66 and is forced down into engaging position against the tension of this spring by an arm 67 carried by the link 46 which engages the upper side of a barrel 68 carried at the outer end of an arm 69 projecting radially from the shaft 64 and normally held in an elevated position by the spring 66. A pin 70 slidably mounted at one end in the barrel 68 and rigidly connected at its opposite end to the arm 69, imparts the swinging movement of the arm 69 to the detent.

A bell 71 may be mounted on the sleeve 10 in position to be struck by a clapper 72 carried by the link 46 during the returning of the latter after the disengagement of the shoulder 48 from the arm 49.

A spring 73 is preferably provided for forcing the barrel 52 outwardly, or to its initial position where it is arrested by the end of the cam 51 contacting with the front frame member 3.

As is apparent from the foregoing description the impression making element and the drum 1 move varying distances from their initial positions, or positions of rest during the spacing action and the extent of such movement is determined by the abutments 32. It is desirable, however, that the handle 2 shall have a substantially uniform pivotal movement, or an inward movement of substantially the same extent for every operation, irrespective of the location of the abutments 32, and for obtaining this action, in the present exemplification of my invention, the shaft 14 is preferably made in sections movable endwise toward and away from each other. The rear section designated 14ᵃ carries the abutment 41 and is connected to the drum 1, and the front section designated 14ᵇ is connected to the handle 2 through the link 15. A spring 14ᶜ is interposed between these two sections and is of sufficient strength to cause the same to move in unison during the aforesaid inward movement obtained by the operation of handle 2 until the movement of the section 14ᵃ is arrested by the before described stop mechanism.

As shown in Fig. 7, the forward or return movement of shaft section 14ᵇ independently of the rear section 14ᵃ is limited by a link interposed between the sections, the front end of which is guided in an axial bore in the rear end of the section 14ᵇ. The front end of the link is also provided with a lengthwisely extending slot through which extends transversely a pin fixed in the rear end portion of section 14ᵇ. When this pin abuts against the end wall of the slot in the link, as shown in Fig. 7, the section 14ᵇ in its forward movement carries with it the section 14ᵃ.

In the operation of the described machine each workman in registering turns the drum 1 until the space assigned to him on the record receiving element is brought to the printing point. This action is accomplished by the workman moving the handle 2 around the dial until the pointer 11 indicates the character 7 which has been assigned to him, at which time the pin 13 will be in registration with the opening 6 associated with such character. The workman then presses the free end of the handle inwardly thereby shifting the shaft 14 inwardly which shifts the drum 1 and impression making element, axially. The extent of movement of the last-named parts is determined by the extent of movement of the shaft section 14ᵃ permitted by the abutment 32 appropriated to said workman's space with which the abutment 41 coöperates. When the movement of the section 14ᵃ has been arrested by the stop mechanism and therethrough the axial movement of the drum and type wheels arrested, the section 14ᵇ continues to move inwardly and the surface 54 coöperating with the arm 53 moves the latter inwardly and therethrough shifts inwardly the barrel 52 so that the cam 51 will depress the arm 49 and through the link 46 will depress the rocking frame 24 for forcing the type wheels into firm contact with the impression receiving element on the drum 1. In the continued movement of the barrel 52 the shoulder 60 will engage the link 46 and shift the same inwardly for disengaging the shoulder 48 thereof from the arm 49, whereupon, under the influence of the springs 25, 63, the link and the aforesaid rocking frame 24 will be restored to their normal upward positions. In this movement the clapper 72 strikes the bell 71 which indicates to the operator that the record has been printed and thereupon he releases the handle 2 and the spring 19 restores this handle to its initial position, and the abutment 41, the impression making element and the drum 1 are returned to their initial positions, or positions of rest. Pressure having been released from the arm 53 the spring 73 returns the barrel 52 to its initial position and the arm 49 is permitted to move up under pressure on the spring 55 so that the free end of the arm will reengage the shoulder 48.

What I claim is:—

1. In a time-recorder for a plurality of workmen, an impression element, and an element carrying an impression receiving surface, means tending to maintain said elements at a predetermined relative position of rest, means operated by the workmen for effecting relative movement of said elements away from said position of rest, and automatic means for determining the extent of such movement including a stepped abutment individual to each workman.

2. In a time-recorder for a plurality of workmen, an impression element, and an element carrying an impression receiving surface, means tending to maintain said elements at a predetermined relative position of rest, means operated by the workmen for effecting relative movement of said elements away from said position of rest, said means being beyond the control of the workman and including a stepped abutment individual to each workman.

3. In a time-recorder, an impression making element, and a drum carrying an impression receiving surface, means tending to maintain said drum at a predetermined position of rest, means operated by the workmen for shifting the drum from said position of rest, and automatic means for determining the extent of said shifting movement.

4. In a time-recorder, an impression making element, and a drum carrying an impression receiving surface, means tending to maintain said drum at a predetermined position of rest, means operated by the workmen for shifting the drum from said position of rest, said means being beyond the control of the workmen.

5. In a recorder having an impression making element, and an element supporting an impression member provided with a plurality of columns each designed to receive a plurality of records spaced apart, and means operated at each actuation of the recorder by the workmen for effecting movement of one of said elements from a predetermined starting point in a direction lengthwise of one of said columns, and means controlled by the number of impressions made in each column for arresting said element at various distances from said starting point, said means including a notched abutment individual to each column, and a part movable with said movable element and coöperating with said abutments.

6. In a workman's time-recorder, an impression receiving element, and an impression making element, a manual, means brought into action by the manual for shifting the receiving element in one direction for registering a predetermined space thereon with the impression making element and for shifting the receiving element in a second direction for effecting spacing between successive impressions, and means for automatically returning the receiving element to its starting position at the end of each of the last-named shifting movements.

7. In a time-recorder the combination with a clock, time-printing devices associated therewith, an element adjustable with respect to the said devices for supporting a record sheet at the impression point in position to receive time-imprints from said devices, and manually actuated means for taking such imprints on a record sheet so supported, of mechanism independent of the clock and beyond the control of the workman and actuated by said imprint-taking means for adjusting the record sheet supporting element to carry printed spaces on the record sheet past the impression point and present thereat an unprinted space on the record sheet.

8. In a time-recorder, the combination with a clock, time-printing devices associated therewith, an element adjustable with respect to the time-printing devices for supporting at the impression point in position to receive time-imprints from said devices, a record sheet having spaces individual to the workman, and manually actuated means for moving said devices into contact with a record sheet so supported to produce such imprints, of mechanism independent of the clock and actuated by said manually actuated means for adjusting the record sheet supporting element in a direction lengthwise of said spaces to carry printed spaces on the record sheet past the impression point and present thereat an unprinted space on the record sheet.

9. In a time-recorder, the combination with time-printing devices, a rotatable drum adjustable in a direction lengthwise of its axis, said drum supporting a record sheet at the impression point to receive time-imprints from said devices, and manually actuated means for rotating the drum and moving the time-printing devices into contact with a record sheet mounted on the drum, to produce the time-imprints, of mechanism actuated by said manually actuated means for adjusting the drum lengthwise of its axis to carry printed spaces on the record sheet past the impression point and present thereat an unprinted space on the record sheet.

10. In a time-recorder, the combination with time-printing devices, an element adjustable relatively to said devices for supporting a record sheet at the impression point in position to receive time-imprints from said devices, and manually actuated means for taking such imprints on a record sheet so supported, of mechanism actuated by the imprint-taking means for adjusting the record sheet supporting element to carry printed spaces on the record sheet past the impression point and present thereat an unprinted space on said sheet, and automatic means for arresting the record sheet supporting element at predetermined points successively farther from its initial position.

11. In a time recorder the combination with a clock, time printing devices associated therewith, an element for supporting the record sheet at the impression point in position to receive time imprints from said devices, a manually actuated means for taking such imprints on the record sheet so supported, of mechanism independent of the clock and actuated by said imprint taking means for producing a relative movement of adjustment between the time printing devices and the record sheet supporting element whereby to have always at the impression point an unprinted space on the record sheet, and means for limiting such movement of adjustment whereby to space the time imprints equally on the record sheet, said means including stepped abutments.

12. In a recorder for printing records for a plurality of men in spaces individual to such men, and with the successive records of the individual men separated by substantially equidistant spaces, an impression making element, a drum carrying an impression receiving surface and having movement about its axis for registering any selected space with the impression making element, and having movement lengthwisely of its axis for effecting said spacing between the successive records, means tending to maintain the drum at a position of rest with respect to said movement lengthwise of its axis, a manual, means associated therewith for moving the drum in an axial direction from said position of rest, a support fixed in respect to the axial movement of the drum and located at one end of the same, and mechanism for controlling the extent of the axial movement of the drum including a slidable device mounted on said support, substantially as and for the purpose described.

13. In a recorder for printing records for a plurality of men in spaces individual to such men, and with the successive records of the individual men separated by substantially equidistant spaces, an impression making element, a drum carrying an impression receiving surface and having movement about its axis for registering any selected space with the impression making element, and having movement lengthwisely of its axis for effecting said spacing between the successive records, means tending to maintain the drum at a position of rest with respect to said movement lengthwise of its axis, a manual, means associated therewith for moving the drum in an axial direction from said position of rest, a support fixed as to axial movement relative to the drum and located in advance of one end thereof, and mechanism for controlling the extent of the movement of the drum lengthwise of its axis, including a device individual to each of said spaces, and provided with a plurality of shoulders, said devices being slidably mounted in said support, substantially as and for the purpose set forth.

14. In a recorder for printing records for a plurality of men in spaces individual to such men, and with the successive records of the individual men separated by substantially equidistant spaces, an impression making element, a drum carrying an impression receiving surface and having movement about its axis for registering any selected space with the impression making element, and having movement lengthwisely of its axis for effecting said spacing between the successive records, means tending to maintain the drum at a position of rest with respect to said movement lengthwise of its axis, a manual, means associated therewith for moving the drum lengthwise of its axis from said position of rest, a support fixed as to axial movement relative to the drum and located in advance of one end thereof, and mechanism for controlling the extent of the axial movement of the drum including a device individual to each of said spaces, and provided with a plurality of shoulders, said devices being slidably mounted in said support, and operating independently of one another, substantially as and for the purpose specified.

15. A time recorder, for a plurality of workmen including an impression making element, and a second element for carrying an impression receiving part, a handle and mechanism operated thereby for effecting relative movement of the elements in one direction for bringing a desired space on the receiving part to the printing point, for effecting relative movement in another direction for making an impression and for effecting relative movement in a third direction for spacing between successive impressions in the same space, said mechanism comprising a frame, a barrel journaled therein and having one of said elements slidably supported thereon, a shaft located in the bore of the barrel and including front and rear sections having movement relative to each other, means interposed between the sections for limiting the relative movement in one direction, a compressible medium also located between the sections for transmitting the movement of one section to the other and for permitting the movement of one section independently of the other, a connection between the rear section of the shaft and the element mounted on the barrel for moving the element with the rear section, an abutment carried by the rear section, a plurality of coöperating abutments individual to the workmen, a connection between the handle and the front section on the shaft for shifting the latter axially, a link shiftable in one direction for effecting the relative movement of the elements for making an impression, and means acting on the link for shifting the same, said means being actuated by the handle in the final portion of said movement thereof, substantially as and for the purpose described.

16. In a workman's time recorder, substantially as described, a frame, a barrel journaled therein, a member of the printing couple having a hub slidably mounted on the barrel, a shaft located in the barrel including front and rear sections movable relatively to each other, a connection between the rear section of the shaft and the hub, means for determining the axial movement of the rear section of the shaft including an abutment carried thereby and a plurality of coöperating abutments, a spring interposed between the sections of the shaft for transmitting the movement of the front section to the rear section and for permitting of movement of the front section independently of the rear section, an operating handle, a connection between the handle and the front section for shifting the latter, a link connected to the other member of the printing couple and provided with a shoulder, an arm pivotally mounted on the frame and having a part engaging the shoulder, a cam coöperating with the arm for shifting the same and thereby shifting the link, and means for operating the cam including a part arranged in the path of movement of the handle to be operated thereby in the final part of the movement of the same, substantially as and for the purpose specified.

17. In a workman's time recorder substantially as described, a frame, a barrel journaled therein, a member of the printing couple slidably mounted on the barrel, a shaft located in the barrel including front and rear sections movable relatively to each other, a connection between the rear section of the shaft and said member of the printing couple, an abutment carried by the rear section of the shaft, a plurality of abutments carried by the frame for coacting with the first-named abutment for arresting the axial movement in one direction on the rear section of the shaft, a link interposed between the sections for limiting the relative movements thereof, a compressible medium between the sections for transmitting the movement of the front section to the rear section and permitting of the independent movement of the front section, a plate carried by the barrel, a handle pivotally mounted on the plate, a connection between the handle and front section of the shaft for shifting the latter with the handle, yielding means tending to hold the handle in its initial position, a sleeve on the barrel, a cam carried thereby, yielding means tending to hold the sleeve in its initial position, means for transmitting the final movement of the handle to the sleeve for shifting it away from its initial position, a pivoted arm acted upon by said cam, a link connected to the other member of the printing couple, and a shoulder on the link for engagement by said arm, substantially as and for the purpose set forth.

18. In a workman's time recorder substantially as described, a frame, a barrel journaled therein, a member of the printing couple slidably mounted on the barrel, a shaft located in the barrel including front and rear sections movable relatively to each other, a connection between the rear section of the shaft and said member of the printing couple, an abutment carried by the rear section of the shaft, a plurality of abutments carried by the frame for coacting with the first-named abutment for arresting the axial movement in one direction on the rear section of the shaft, a link interposed between the sections for limiting the relative movements thereof, a compressible medium between the sections for transmitting the movement of the front section to the rear section and permitting of the independent movement of the front section, a plate carried by the barrel, a handle pivotally mounted on the plate, a connection between the handle and front section of the shaft for shifting the latter with the handle, yielding means tending to hold the handle in its initial position, a sleeve on the barrel, a cam carried thereby, yielding means tending to hold the sleeve in its initial position, means for transmitting the final movement of the handle to the sleeve for shifting it away from its initial position, a pivoted arm acted upon by said cam, a link connected to the other member of the printing couple, and provided with a shoulder, yielding means tending to hold the shoulder in engagement with the arm, and means on the sleeve for engaging the link for shifting the same in a direction to disengage the shoulder from the arm, substantially as and for the purpose described.

19. In a workman's time recorder substantially as described, a frame, a barrel journaled therein, a member of the printing couple slidably mounted on the barrel, a shaft located in the barrel including front and rear sections, a connection between the rear section and said member of the printing couple, an abutment carried by the rear section of the shaft, other abutments coöperating therewith for limiting its movement, means interposed between the sections for transmitting the movement of the first section to the second and permitting of the movement of the first section independently of the second, a plate carried by the barrel, a handle pivotally mounted on the plate, a lever pivotally connected at one end to the front section of the shaft and at its opposite end to the plate and intermediate of its ends to the handle, means tending to move the shaft in a forward direction, a sleeve mounted on the barrel, an arm pivotally connected at one end to the plate and having its opposite end coöperating with the sleeve, said arm being arranged in the path of movement on the handle for engagement thereby, yielding means tending to force the sleeve in one direction, a cam carried by the sleeve, an arm pivoted to the frame and having a part for coöperation with the cam, a link associated with the other member of the printing couple and having a shoulder for engagement by the last-named arm, yielding means acting on the link for holding the shoulder thereof in engagement with the arm, and means on the sleeve for engagement with the link for shifting the same to disengage the shoulder thereof from the arm, substantially as and for the purpose specified.

20. In a workman's time recorder substantially as described, a frame, a barrel journaled therein having one end extending in advance of the front frame member, a member of the printing couple slidably mounted on the barrel, a second member of the printing couple, a rocking part carrying the same for moving it toward and from the other member of the printing couple, a sectional shaft located within the barrel, a connection between the rear section of the shaft and the first-named member of the printing couple, abutments carried by the shaft and frame, respectively, for limiting the movement of the rear section of the shaft, yielding means between the two shaft sections, a plate carried by said projecting end of the barrel, a handle pivotally connected at one end to the plate, a lever connected at one end to the front section of the shaft and pivotally supported at its other end from the plate at a point between the shaft and the pivoted end of the handle, means for connecting the handle to the intermediate part of said lever, yielding means for forcing the lever forwardly, a sleeve mounted on the barrel, means for transmitting the final part of the movement of the handle to the sleeve for shifting the same rearwardly, yielding means tending to hold the sleeve in its initial position, a cam carried by the sleeve, a shoulder carried by the sleeve arranged in advance of the cam, an arm pivoted to the frame having a part coöperating with the cam, a link connected to the rocking part carrying the second member of the printing couple, said link having a portion encircling the sleeve and a shoulder for engagement with the last-named arm, and means tending to hold the shoulder in the path of movement of said arm, the said shoulder on the sleeve being designed in the final rearward movement of the latter to strike the link and disengage the shoulder thereof from the arm, substantially as and for the purpose set forth.

21. In a workman's time recorder, substantially as described, a frame, a barrel journaled therein, an impression receiving member of the printing couple slidably mounted on the barrel, a printing member including a minute wheel, a rocking frame carrying the printing member, means for holding the wheel of the printing member against movement about its axis during the printing operation, said means including a pivoted detent having a laterally extending arm, a link connected to said rocking frame and depending therefrom and having a laterally extending arm coöperating with the laterally extending arm of the detent, a shaft located within the barrel including front and rear sections, a connection between the rear section of the shaft and the receiving member of the printing couple, an abutment carried by the rear section of the shaft, coöperating abutments supported from the frame, yielding means interposed between the shaft sections, a sleeve on the barrel provided with a cam surface and with a shoulder in advance thereof, said link having a part encircling said sleeve and having a shoulder, an arm pivoted to the frame having a part coöperating with the cam and a part for engaging the shoulder on the link, yielding means tending to hold the link in position for the engagement of the shoulder thereof with the arm, yielding means tending to move the sleeve forwardly, a plate fixedly connected to the barrel, an arm pivoted to the plate having an end for coöperating with the sleeve for shifting the same in one direction, a handle pivotally mounted on the plate, a lever pivotally connected at one end to the plate, at its other end to the front section of the shaft and at its intermediate part to the handle, yielding means tending to move the shaft forwardly, and a part on the handle for engagement with the arm pivoted to the plate, substantially as and for the purpose described.

22. In a recorder for printing records for a plurality of men in spaces individual to such men, and with the successive records of the individual men separated by substantially equidistant spaces, an impression making element, a drum carrying an impression receiving surface and having movement about its axis for registering any selected space with the impression making element, and having movement lengthwise of its axis for effecting said spacing between the successive records, means tending to maintain the drum at a position of rest with respect to said axial movement, a manual, means associated therewith for moving the drum in an axial direction from said position of rest, a support fixed as to axial movement relative to the drum and located in advance of one end thereof, and mechanism for controlling the extent of the axial movement of the drum including a plurality of devices arranged in circular formation, and each provided with a plurality of shoulders, said devices being slidably mounted in said support and operating independently of one another, and a part fixed in relation to the drum and movable therewith, said part registering with the device associated with a selected space when the drum is moved for registering such space with the impression making element, and coöperating with such device as the drum is moved lengthwise of its axis for arresting the movement of the drum and for moving the device to a new position, substantially as and for the purpose described.

In testimony whereof, I have hereunto signed my name, in the presence of two attesting witnesses, at Syracuse, in the county of Onondaga and State of New York, this 8 day of May, 1911.

CHARLES E. TOMLINSON.

Witnesses:
S. Davis,
L. M. Davis.

Copies of this patent may be obtained for five cents each, by addressing the "Commissioner of Patents, Washington, D. C."